(No Model.)
G. W. CROFOOT.
TWO WHEELED VEHICLE.
No. 290,976. Patented Dec. 25, 1883.
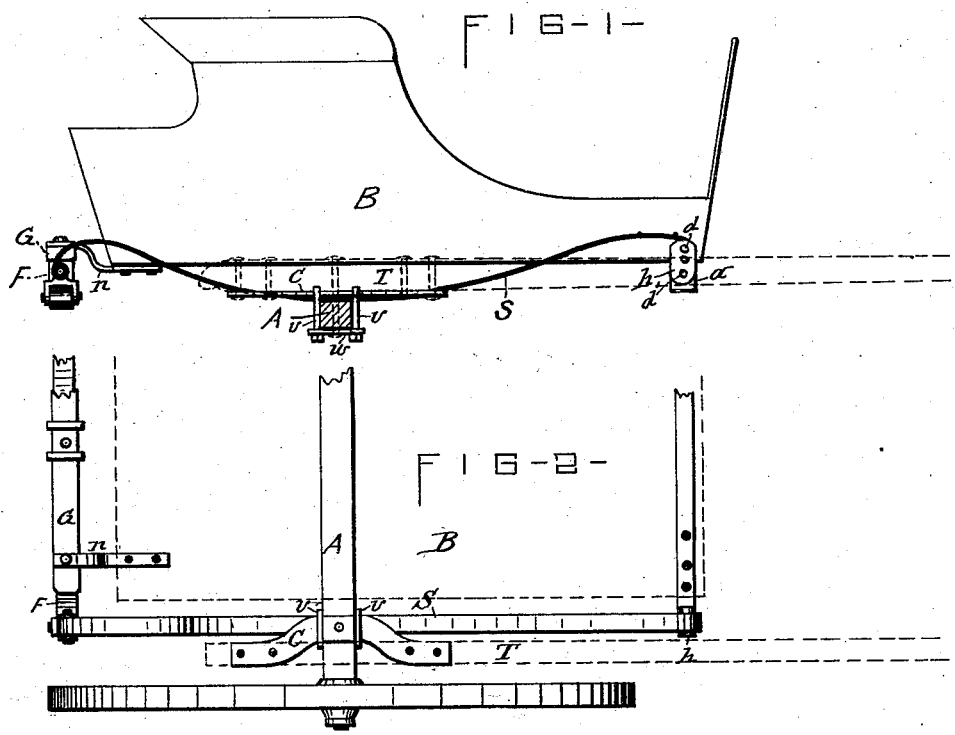
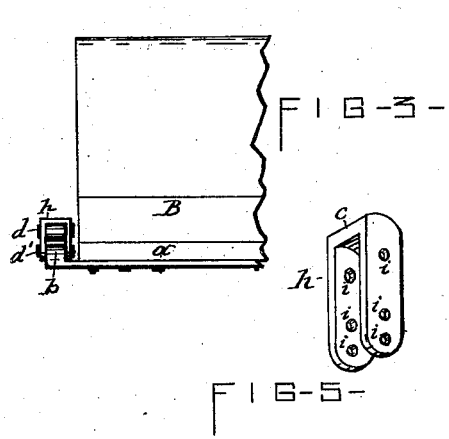
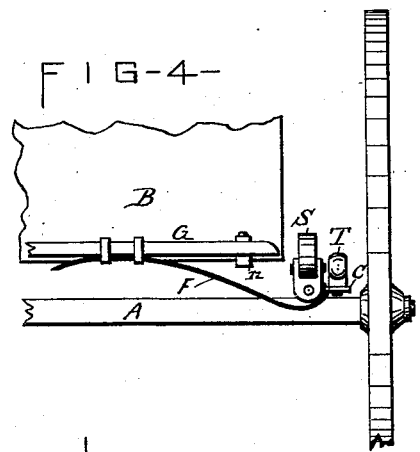
WITNESSES— INVENTOR—

UNITED STATES PATENT OFFICE.

GEORGE W. CROFOOT, OF TULLY, N. Y., ASSIGNOR TO HARRIET L. CROFOOT, OF SAME PLACE, AND GEORGE H. SMITH, OF BALDWINSVILLE, N. Y.

TWO-WHEELED VEHICLE.

SPECIFICATION forming part of Letters Patent No. 290,976, dated December 25, 1883.

Application filed September 13, 1883. (No model.)

*To all whom it may concern:*

Be it known that I, GEORGE W. CROFOOT, of Tully, in the county of Onondaga, in the State of New York, have invented new and useful Improvements in Two-Wheeled Vehicles, of which the following, taken in connection with the accompanying drawings, is a full, clear, and exact description.

This invention consists in improved means for elastically supporting the body of a two-wheeled vehicle, and in certain novel means of connecting therewith the thills, all as hereinafter fully described, and specifically set forth in the claim.

In the annexed drawings, Figure 1 is a side elevation of a two-wheeled vehicle, taken back of the wheel to better illustrate my invention. Fig. 2 is a plan view of one side of the vehicle, with the body shown in dotted lines. Fig. 3 is a front view of one side of the body. Fig. 4 is a rear end view of one side of the vehicle, and Fig. 5 is an enlarged isometric detached view of the hanger by which the forward end of the body is connected with the springs.

Similar letters of reference indicate corresponding parts.

A represents the axle of the vehicle, and B denotes the body, supported by side springs, S, which are in the form of the half of a platform-spring gear. Said side springs are mounted on the axle at the outside of the body, and have their rear end coupled to a cross-spring, F, to the top of which is attached a cross-bar, G, the body B being hung on said cross-bar by braces $n$, which reach under the rear end of the body and are firmly attached thereto.

To the under side of the forward end of the body is attached a cross-bar, $a$, which may be constructed entirely of metal or of a wooden central or main portion and metallic ends attached thereto. The ends of said cross-bar are formed with a sleeve, $b$, which stands with its axis parallel with the cross-bar.

To the forward end of the side springs, S, is connected a U-shaped hanger, $h$, the cross-plate $c$ of which is concaved to form a bearing for the knuckle or eye on the end of the spring, the hanger being connected with the said eye by a bolt, $d$, passing through holes $i$ in the shanks of the hanger end through the eye of the spring. The sleeve $b$ of the cross-bar is fitted endwise between the shanks of the hanger $h$, and said shanks are provided with a series of holes, $i$ $i$, at different elevations, to allow the cross-bar $a$ to be supported at a greater or less elevation by the bolt $d'$, passing through one set of the eyes $i$ and through the sleeve of the cross-bar. The described means of connecting the forward end of the body to the supporting-spring allows the latter to freely vibrate without producing a forward thrust of the body, and thus obviates to a great extent unpleasant longitudinal rocking motion of the body.

T denotes the thill, secured to the axle by means of a jack, C, in the form of a metal plate, the central portion of which lies on top of the spring S, directly over the axle, and is secured to the latter conjointly with the spring by means of clips $v$ $v$, placed astride of the jack and spring at opposite sides of the axle, and clip-bars $w$, placed across the under side of the axle and connecting the two clips. The ends of the jack are extended forward and rearward, and are deflected laterally, so as to stand clear of the spring, and to the top of the said ends of the jack is attached the thill T. This peculiar form of the jack and its attachment with the axle and superimposed spring forms a substantial brace, which effectually sustains said parts in their requisite positions.

Having described my invention, what I claim as new, and desire to secure by Letters Patent, is—

In combination with the body B and side spring, S, the cross-bar $a$, formed at the ends, with the sleeve $b$, standing with its axes parallel with said bar, the hanger $h$, of U shape, and having its cross-plate $c$ formed concave, and its shanks provided with a series of bolt-holes, $i$ $i$, and the coupling-bolts $d$ $d$, all substantially in the manner shown and described.

In testimony whereof I have hereunto signed my name and affixed my seal, in the presence of two attesting witnesses, at Syracuse, in the county of Onondaga, in the State of New York, this 3d day of September, 1883.

GEORGE W. CROFOOT. [L. S.]

Witnesses:
C. H. DUELL,
FREDERICK H. GIBBS.